United States Patent

Ohishi et al.

[11] Patent Number: 5,623,327
[45] Date of Patent: Apr. 22, 1997

[54] CAMERA HAVING MEMORY DEVICE WHICH STORES TIMER VALUES USED IN THE COMPUTATION OF VELOCITY OF AN IMAGE BLUR SUPPRESSION LENS

[75] Inventors: Sueyuki Ohishi, Tokyo; Nobuhiko Terui, Ichikawa, both of Japan

[73] Assignee: Nikon Corporation, Tokyo, Japan

[21] Appl. No.: 469,819

[22] Filed: Jun. 6, 1995

[30] Foreign Application Priority Data

Jun. 6, 1994 [JP] Japan .................................. 6-147162

[51] Int. Cl.6 ............................................. G03B 7/08
[52] U.S. Cl. ............................................................. 396/55
[58] Field of Search ........................... 354/430, 70, 202; 348/208

[56] References Cited

U.S. PATENT DOCUMENTS 5,060,007  10/1991  Egawa .................................... 354/430
5,307,113   4/1994  Egawa .................................... 354/430

*Primary Examiner*—Safet Metjahic
*Assistant Examiner*—J. K. Han
*Attorney, Agent, or Firm*—Staas & Halsey

[57] ABSTRACT

A camera which compensates for vibrations to reduce image blur by shifting an image blur suppression lens. The image blur suppression lens is movable in directions perpendicular to the optical axis of the camera. An interrupter detects the position of the image blur suppression lens and produces a position detection signal having change points occurring to indicate the position of the image blur suppression lens. A timer produces a count value and a memory device stores the count value of the timer when a change point occurs in the position detection signal. A control device determines the displacement velocity of the image blur suppression lens from the count value stored in the memory device. In this manner, the accuracy and efficiency of the computation of the displacement velocity is improved.

15 Claims, 8 Drawing Sheets

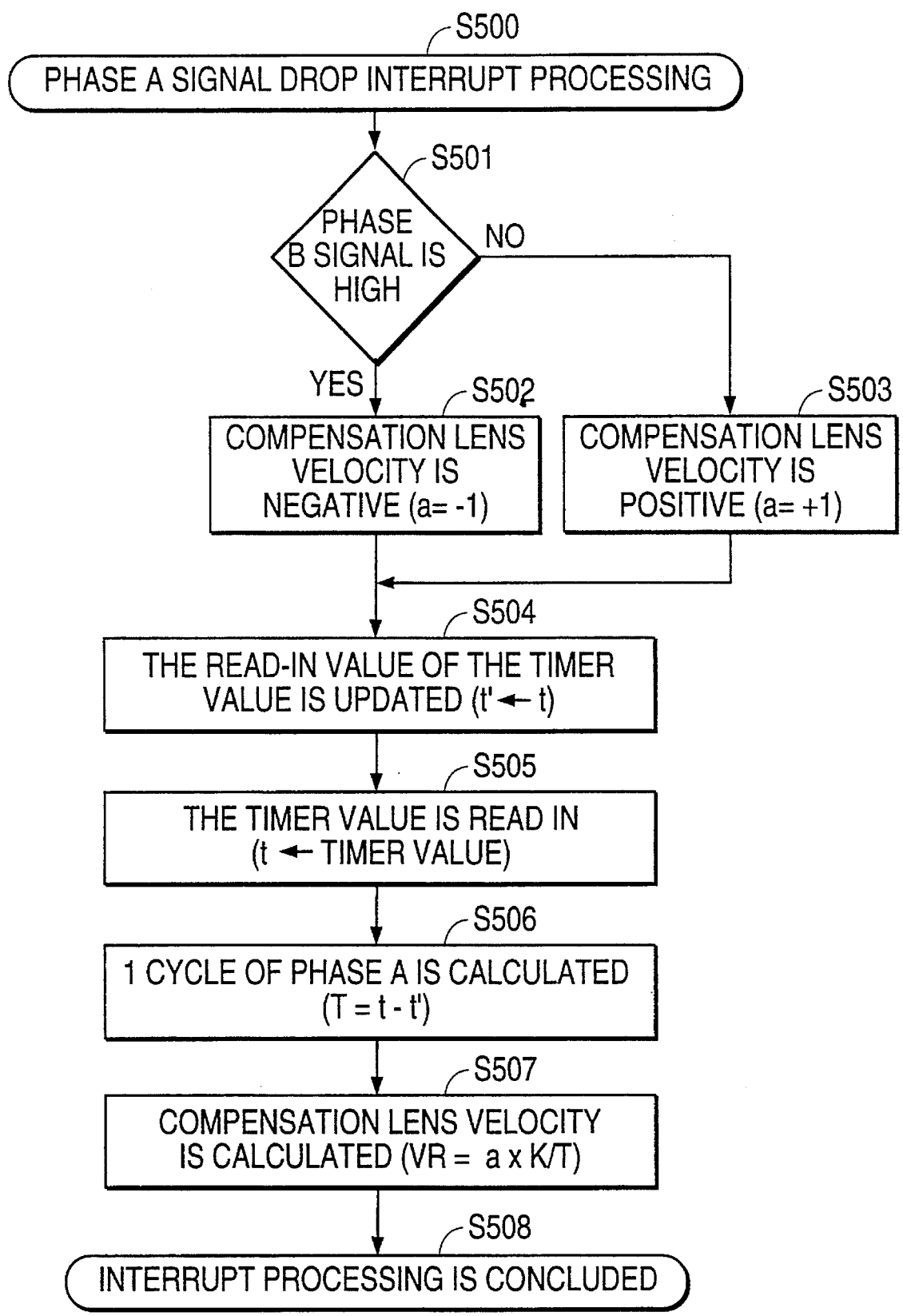

CAMERA HAVING MEMORY DEVICE WHICH STORES TIMER VALUES USED IN THE COMPUTATION OF VELOCITY OF AN IMAGE BLUR SUPPRESSION LENS

BACKGROUND OF THE INVENTION

1. Field of the Invention

The present invention is related to a camera which shifts an image blur suppression lens to compensate for vibrations affecting the camera, thereby suppressing image blur. More particularly, the present invention relates to a timer and the storage of the timer count values for the computation of the displacement velocity of the image blur suppression lens.

2. Description of the Related Art

Image blur suppression devices suppress, or reduce, blurring of an image projected onto an image plane by an optical system. Motion is typically imparted to the optical system by vibrations affecting the optical system or in a surrounding holding member. In general, conventional image blur suppression devices cause an image blur suppression lens to shift counter to the motion of the optical system so as to shift the image projected by the optical system relative to the optical system.

Conventional cameras use an image blur suppression device to suppress image blur on film resulting from vibrations, such as hand vibrations, affecting the camera. These cameras typically use an angular velocity sensor to detect vibrations by sensing the angular velocity of the camera. Then, an image blur suppression lens is shifted in a direction perpendicular to the optical axis of the photographic optical system, thereby compensating for the detected vibration. For example, see Japanese Patent Publication Number Hei 4-263056.

More specifically, in conventional cameras, an image blur suppression lens is driven by an actuator. The actuator is typically a motor. A vibration detection unit, including an angular velocity sensor, detects the angular velocity of the camera and produces signals proportional to the detected angular velocity. A single chip microcomputer receives the signals produced by the vibration detection unit and effectively cancels the detected vibrations by controlling the motor to shift the image blur suppression lens in accordance with the vibrations detected by the vibration detection unit. When a motor is used as an actuator, the image blur suppression lens is driven by reducing the velocity of the motor rotation with gears, and converting the rotational movement of the gears into linear motion. The microcomputer uses feedback from the actual detected velocity of the image blur suppression lens to shift the image blur suppression lens at a suitable velocity. The image blur suppression lens is shifted at a velocity which is computed in a conventional manner.

FIG. 1 is a block diagram of a conventional camera which suppresses image blur by compensating for vibrations affecting the camera. More particularly, FIG. 1 relates to a camera which uses silver salt film (not illustrated). A conventional vibration detection unit 5 detects vibrations affecting the camera by using an angular velocity sensor (not illustrated) to detect angular velocity, and produces signals indicating the amount of detected angular velocity. The angular velocity detected by vibration detection unit 5 changes in accordance with the angular velocity of the camera produced by hand vibration. The signals produced by vibration detection unit 5 are received by a central processing unit (CPU) 1. Since the output of vibration detection unit 5 is typically an analog signal, CPU 1 uses an internally incorporated analog-to-digital (A/D) converter (not illustrated) to convert this analog signal into a digital signal.

CPU 1 detects the position and velocity of a conventional image blur suppression lens 8 using a phase A signal and a phase B signal produced by a conventional detection interrupter 3. Therefore, detection interrupter 3 can be referred to as a "position detection device" which detects the position of the image blur suppression lens and produces a position detection signal indicating the position of the image blur suppression lens. CPU 1 compensates for detected vibration by controlling a conventional motor drive unit 2 in accordance with the signals produced by vibration detection unit 5. Motor drive unit 2 then drives a conventional motor (M) 4 to shift image blur suppression lens 8. Moreover, CPU 1 uses the detected velocity of image blur suppression lens 8 as feedback to control image blur suppression lens 8 so that image blur on the photographic image plane caused by vibration is effectively cancelled. Therefore, CPU 1 can be referred to as a "control device" which determines the velocity of the image blur suppression lens and controls the image blur suppression lens in accordance with the velocity. Image blur suppression lens 8 is shifted to compensate for vibrations affecting the camera, thereby suppressing image blur. Image blur suppression lens 8 can also be referred to as a "vibration compensation lens" or "compensation lens", and hereinafter will be referred to as "compensation lens 8".

To effectively compensate for vibrations, compensation lens 8 must be shiftable in two different axes which intersect, are perpendicular to each other, and are perpendicular to the optical axis of the camera, although only one axis 100 is illustrated in FIG. 1. Therefore, compensation lens 8 can be described as a "movable member" which is movable to compensate for vibrations affecting the camera.

Since vibration detection must be executed in real time, the output of vibration detection unit 5 is subjected to A/D conversion by CPU 1 at a relatively short sampling interval, for example, a 1 ms interval, and compensation lens 8 is shifted in accordance with the vibration detected during this interval. Compensation lens 8 is driven by gears (not illustrated) to convert the rotation of motor 4 into linear motion. A transmittance encoder is typically used to detect the position and velocity of compensation lens 8 by interacting with the gears. More specifically, a circular plate (not illustrated) has several holes opened therein and is attached to a gear (not illustrated) that converts the rotation of motor 4 into linear motion. Detection interrupter 3 includes two pairs of interrupters (not illustrated) arranged on the circular plate in positions to detect the holes in the circular plate. Moreover, the two pairs of interrupters are arranged so that the detection output of the respective pairs has a phase differential of 90°.

FIG. 2 illustrates an example of a two-phase output of interrupter 3 for detecting the position of compensation lens 8. A "phase A" signal and a "phase B" signal are produced by interrupter 3 via the rotation of motor 4, are respectively produced by two pairs of interrupters (not illustrated). The phase A signal and the phase B signal have differing phases of 90°. The absolute value of the velocity of the movement of compensation lens 8 can be calculated from the frequency of the output from either the phase A signal or the phase B signal. Moreover, the direction of movement of compensation lens 8 (the sign for the velocity of compensation lens 8) is detected in accordance with the signal level of one signal at a change in the other signal. For example, the direction of movement of compensation lens 8 can be detected by determining whether one phase signal is at a high level or a low level when the other phase signal is at a rising edge or a falling edge. Also, the position of compensation lens 8 is detected by this direction of movement and by counting up or counting down from an edge of either signal.

The detection of the position, velocity and direction of movement of compensation lens 8 is executed by CPU I based on the output of the phase A signal and the phase B signal produced by detection interrupter 3, and can be understood by referring to FIG. 2. As illustrated by FIG. 2, CPU 1 detects a first drop in the phase A signal at time t1, and the phase of the phase B signal is read at time t1. In the example illustrated in FIG. 2, the phase B signal is low at time t1. Therefore, the value of the compensation lens position is counted as "1". Next, a drop of the phase A signal is detected at time t2, and the phase of the phase B signal is read at time t2. In the example illustrated in FIG. 2, the phase B signal is low at time t2. Therefore, the value of the compensation lens position is again counted as "1". An additional drop of the phase A signal is detected at time t3. In the example illustrated in FIG. 2, the phase B signal is high at time t3. Therefore, the value of the compensation lens position is counted at "−1". The position of compensation lens 8 is detected in real time by repeating this procedure.

Next, the time T1 from the time t1 of the drop of the phase A signal until the next drop of the phase A signal at time t2 is calculated using a timer. The absolute value of compensation lens velocity VR is computed by taking the inverse number of T1. The compensation lens velocity VR sign is taken to be "plus" if the phase B signal is low at time t2, and is taken to be "minus" if the phase B signal is high at time t2. This is expressed in the following Equations 1 and 2. The compensation lens velocity VR is detected in real time by repeating this procedure after time t2.

Equation 1

$$VR = a \times K \times (1/(\text{the time of one cycle of the phase A signal}))$$

Equation 2

$a = +1$    If the phase $B$ signal is Low at the drop of the phase $A$ signal $\phantom{a} = -1$    If the phase $B$ signal is High at the drop of the phase $A$ signal In Equation 2, the variable "a" indicates the sign of the velocity of compensation lens 8, and K is a coefficient for adjusting the units with the target velocity VC of compensation lens 8.

FIG. 3 is a block diagram illustrating a conventional camera having a vibration control function. As illustrated by FIG. 3, a conventional edge detection circuit 11 detects a drop edge of the phase A signal, and generates an interrupt signal at the time when a drop edge is detected. A conventional timer 12 is connected to CPU 1 and receives a specified clock signal φ for calculating one cycle of the phase A signal. The timer value of timer 12 is counted up as time progresses. CPU 1 begins phase A signal drop interrupt processing when edge detection circuit 11 generates an interrupt signal.

FIG. 4 is a flow chart illustrating a conventional phase signal drop interrupt processing of a camera. More specifically, FIG. 4 illustrates a conventional phase A signal drop interrupt processing sequence of CPU 1 to detect the velocity of compensation lens 8. The phase A signal drop interrupt processing of FIG. 4 begins in step S500 when edge detection circuit 11 detects a drop of the phase A signal. Then, in step S501, it is determined whether or not the phase B signal is high. If the phase B signal is high in step S501, the process moves to step S502 where the velocity of compensation lens 8 is taken to be negative with variable "a" equal to "−1". If the phase B signal is low in step S501, the process moves to step S503 where the velocity of compensation lens 8 is taken to be positive with variable "a" equal to "+1". From steps S502 and S503, the process moves to step S504. In step S504, the value "t" represents the value of timer 12 that was set during the previous phase A signal drop interrupt processing, and "t" is entered as the variable "t'". Therefore, by entering "t" as the variable "t'", a "read-in" value of the timer value is updated. Then, in step S505, the value in timer 12 is read by taking the current value of timer 12 to be "t". Next, in step S506, the time T of one cycle of the phase A signal is calculated by subtracting t' from t. From step S506, the process moves to step S507 where the compensation lens velocity VR is computed in a conventional manner by multiplying coefficient "K" and variable "a" (the sign of the velocity of the compensation lens that was calculated in steps S502 and S503), by the inverse of T. Specifically, the compensation lens velocity VR is computed by Equation 1, above. From step S507, the process moves to step S508 where the phase A signal drop interrupt processing ends.

The above computations will be further explained by referring again to FIG. 2. Assumed that a phase A signal drop is detected at time t2. Therefore, in step S504 of FIG. 4, the previous timer value of timer 12 that was set at the time of the previous phase A signal drop interrupt processing (equivalent to the value of timer 12 at time t1 in FIG. 2) equals "t", and "t" is entered as variable t'. Then, in step S505 of FIG. 4, the current timer value of timer 12 (equivalent to the value of timer 12 at time t2 in FIG. 2) is entered as variable t. Then, in step S506 of FIG. 4, the time T is derived by subtracting t' from t. T is equivalent to T1 in FIG. 2. The velocity of compensation lens 8 is derived by the calculations performed in step S507 of FIG. 4. Here, K is the coefficient for the purpose of bringing the units in line with the standard velocity VC of the compensation lens. Moreover, variable "a" is the sign of the velocity of compensation lens 8 derived by the processing at S502 and S503 (see FIG. 4), and velocity VR of compensation lens 8, including everything but the sign, is calculated by multiplying variable "a" by the absolute value of the velocity of compensation lens 8 that was derived in step S507 in FIG. 4. The velocity of compensation lens 8 is continually detected in real time by repeating the phase A signal drop interrupt processing, explained above, each time a phase A signal drop is detected.

FIG. 5 is a flow chart illustrating a processing sequence of vibration compensation control timer interrupt processing performed by CPU 1 to control vibration compensation. The timer interrupt processing illustrated in FIG. 5 is repeatedly executed at intervals of, for example, 1 ms, by CPU 1. The process begins in step S600. From step S600, the process moves to step S601 where the output of vibration detection unit 5 is subjected to analog-to-digital (A/D) conversion using an A/D converter (not illustrated) incorporated into CPU 1, and the angular velocity produced in the camera is detected. The output of the vibration detection unit 5 is not limited to the dimensions of angular velocity, but in order to simplify the following explanation, the following discussion will continue to assume that vibration detection unit 5 detects angular velocity. Next, in step S602, the target velocity VC of compensation lens 8 is computed from the angular velocity detected at S601 utilizing, for example, the following Equation 3.

Equation 3

$$VC = K0 \times (\text{detected angular velocity})$$

K0 is a coefficient. If compensation lens 8 shifts at some velocity in relation to the detected angular velocity, it is determined whether vibration compensation can be suitably executed to meet the characteristics of the photographic optical system. Next, in step S603, the amount of drive of drive motor 4 is calculated using the target velocity VC of compensation lens 8 calculated at S602 and velocity VR of compensation lens 8 calculated in step S507 of the phase A signal drop interrupt processing of FIG. 4. From step S603, the process moves to step S604 where motor 4 is driven by the calculated drive amount via motor drive unit 2. From step S604, the process moves to step S605 where the vibration compensation control timer interrupt processing ends. The vibration compensation control timer interrupt processing of FIG. 5 is repeatedly executed at a specified interval, and compensation lens 8 is controlled to be at the target velocity VC with relatively good precision and in real time, based on the computations in step S603 of FIG. 5.

However, there are problems with conventional cameras which operate in accordance with phase A signal drop interrupt processing as in FIG. 4 and vibration compensation control timer interrupt processing as in FIG. 5. Ideally, the detection of velocity VR of compensation lens 8 is first conducted as described in FIGS. 4 and 5. Unfortunately, there is limited time from when edge detection circuit 11 detects a drop of the phase A signal until the value of timer 12 is read in at S505 by the phase A signal drop interrupt processing of FIG. 4. Also, vibration compensation control may be executed during vibration compensation control timer interrupt processing and the drop of the phase A signal may be entered during the execution of the vibration compensation control timer interrupt processing. As a result, the activation of the phase A signal drop interrupt processing may be temporarily delayed, and the phase A signal drop interrupt processing may be executed after the vibration compensation control timer interrupt processing has been completed.

As a result, the time of one cycle from the phase A signal drop detected by phase A signal drop interrupt processing has an element that fluctuates. Therefore, as illustrated by FIG. 2, even though the phase A signal drop is entered at time t1, the value of timer 12 actually read in at step S505 in FIG. 4 is time t1'. The next phase A signal drop is entered, and the value of timer 12 actually read in is time t2'. One cycle of phase A signals calculated based on the times at step S506 is computed as T1', thereby producing an error in relation to the actual time T1.

Error is produced in the velocity of compensation lens 8 detected by the above-described conventional method and, therefore, the precision of vibration control is poor. Thus, it may also be impossible to accurately detect compensation lens velocity VR when the camera shutter control during exposure is simultaneously executed by CPU 1. Furthermore, accurate detection of compensation lens velocity VR may be impossible when shutter control is executed using timer interrupts which are activated at specific intervals in the same way as the vibration compensation control timer interrupt processing.

In addition, photographic devices having this type of conventional vibration compensation raise the resolution for the detection of the position of compensation lens 8 in order to improve the performance of vibration control. To enhance the resolution requires an increase in the number of holes in the circular plate used in interrupter detection. By doing this, the method increases the number of phase A signal and phase B signal pulses per unit of shift distance of compensation lens 8. If this is done, the phase A signal drop interrupt processing of FIG. 4 for the purpose of deriving the velocity of compensation lens 8 is frequently executed and, in the worst case, the processing capacity of CPU I may be exceeded and processing becomes impossible. Because the vibration compensation control timer interrupt processing of FIG. 5 for the purpose of correcting and controlling vibration must also be conducted simultaneously, it is necessary to have an extremely high performance one-chip microcomputer to execute the entire processing. This dramatically increases the cost of the camera.

SUMMARY OF THE INVENTION

It is therefore an object of the present invention to provide a camera having improved precision in the detection of the movement velocity of the compensation lens.

It is also an object of the present invention to provide a camera which can detect the velocity of the compensation lens and which can control vibration compensation without requiring a high performance one-chip microcomputer.

It is a further object of the present invention to provide a camera which improves the efficiency and accuracy in the computation of the displacement velocity of the compensation lens.

Moreover, it is an object of the present invention to reduce inaccuracy in the computation of the displacement velocity of the compensation lens by reducing the effect of interrupt signals corresponding to other computation processes occurring in the camera.

Objects of the present invention are achieved by providing an optical device which includes a movable member movable, such as a compensation lens, to compensate for vibrations affecting the optical device. A position detecting device, such as an interrupter, detects the position of the movable member and produces a position detection signal having change points occurring to indicate the position of the movable member. A timer produces a count value and a first memory device stores the count value of the timer when a change point occurs in the position detection signal. A control device, such as a CPU, determines the displacement velocity of the movable member from the count value stored in the first memory device.

Moreover, first and second change points occur in the position detection signal and the timer produces first and second count values corresponding, respectively, to the first and second change points. The first memory device stores the first count value of the timer upon the occurrence of the first change point. A second memory device receives the first count value from the first memory device upon the occurrence of the second change point. Thereafter, the first memory device receives the second count value from the timer. The control device receives the first count value from the second memory device and the second count value from the first memory device and determines the displacement velocity of the movable member in accordance with the first and second count values.

BRIEF DESCRIPTION OF THE DIAGRAMS

These and other objects and advantages of the invention will become apparent and more readily appreciated from the following description of the preferred embodiments, taken in conjunction with the accompanying drawings, of which:

FIG. 4 (prior art) is a flow chart illustrating a conventional phase signal drop interrupt processing of a camera.

DESCRIPTION OF THE PREFERRED EMBODIMENTS

Figure 1:
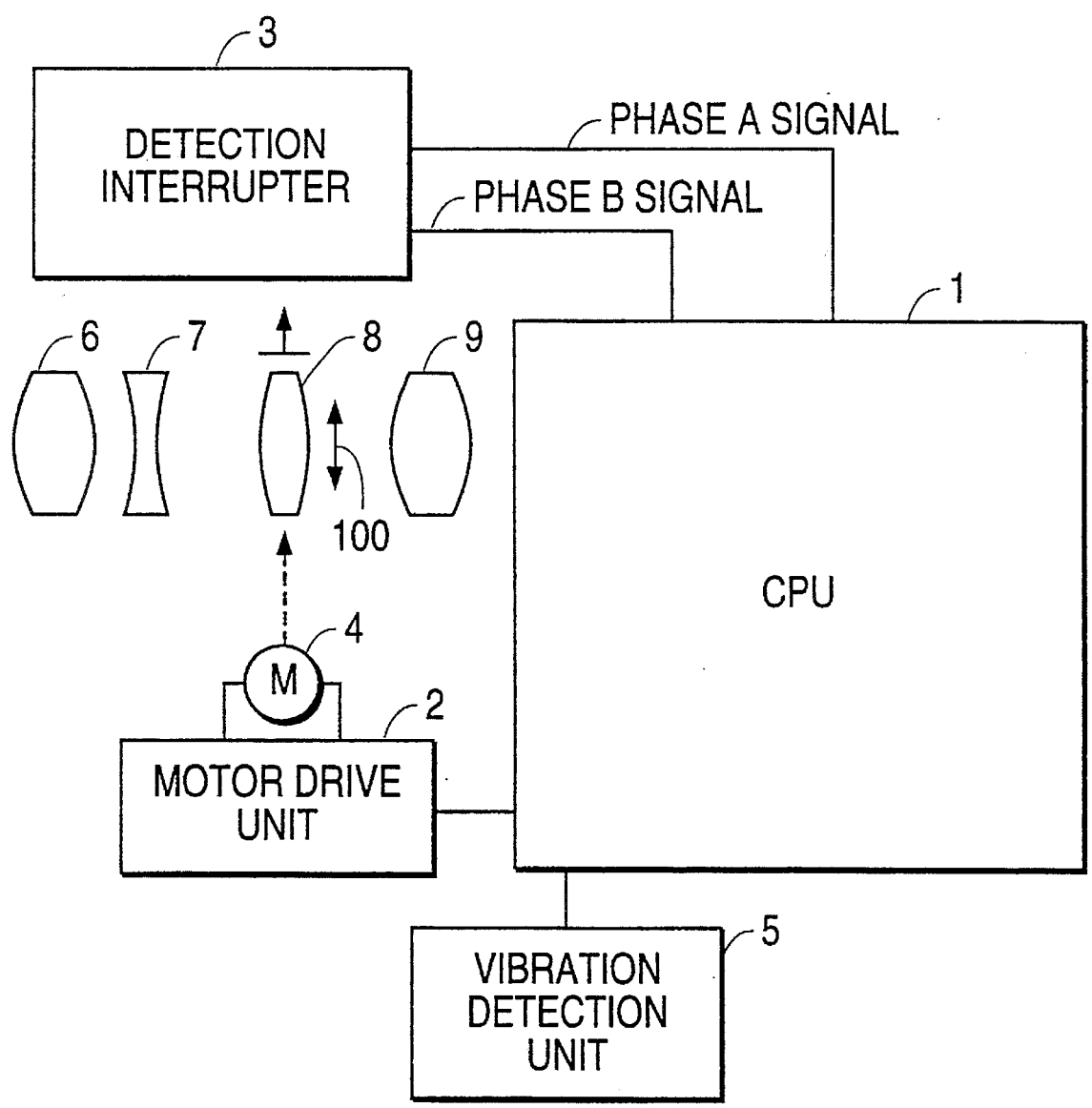
FIG. 1 (prior art) is a block diagram illustrating a camera having a conventional vibration compensation function.
Figure 3:
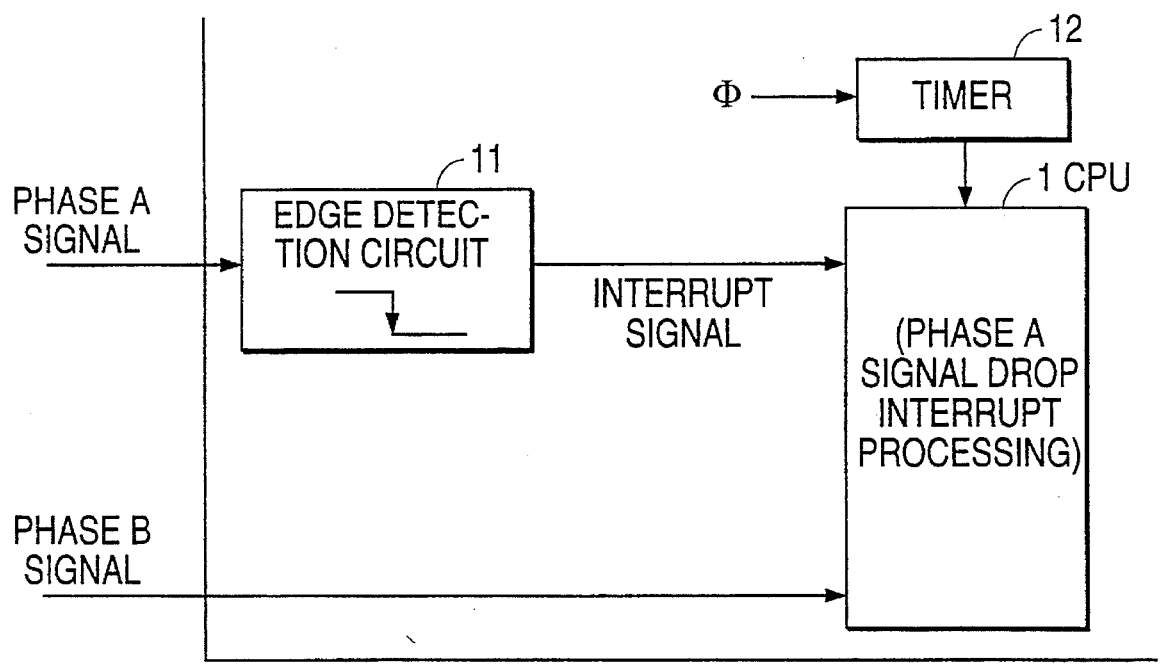
FIG. 3 (prior art) is a block diagram illustrating a conventional camera having a vibration control function.

Reference will be made in detail to the present preferred embodiments of the present invention, examples of which are illustrated in the accompanying drawings, wherein like reference numerals refer to like elements throughout.

As illustrated in the previously described FIG. 1, vibration detection unit 5 detects vibrations affecting the camera by using an angular velocity sensor (not illustrated) to detect angular velocity, and produces signals indicating the amount of detected angular velocity. The signals produced by vibration detection unit 5 are received by central processing unit (CPU) 1. CPU 1 compensates for detected vibration by controlling motor drive unit 2 in accordance with the signals produced by vibration detection unit 5. Motor drive unit 2 then drives a motor 4 to shift compensation lens 8. CPU 1 detects the position and velocity of compensation lens 8 using a phase A signal and a phase B signal produced by detection interrupter 3. However, according to embodiments of the present invention, the processing sequence of CPU 1, and peripheral circuits connected to, or formed by, CPU 1 are different from a conventional camera as previously discussed.

Figure 6:
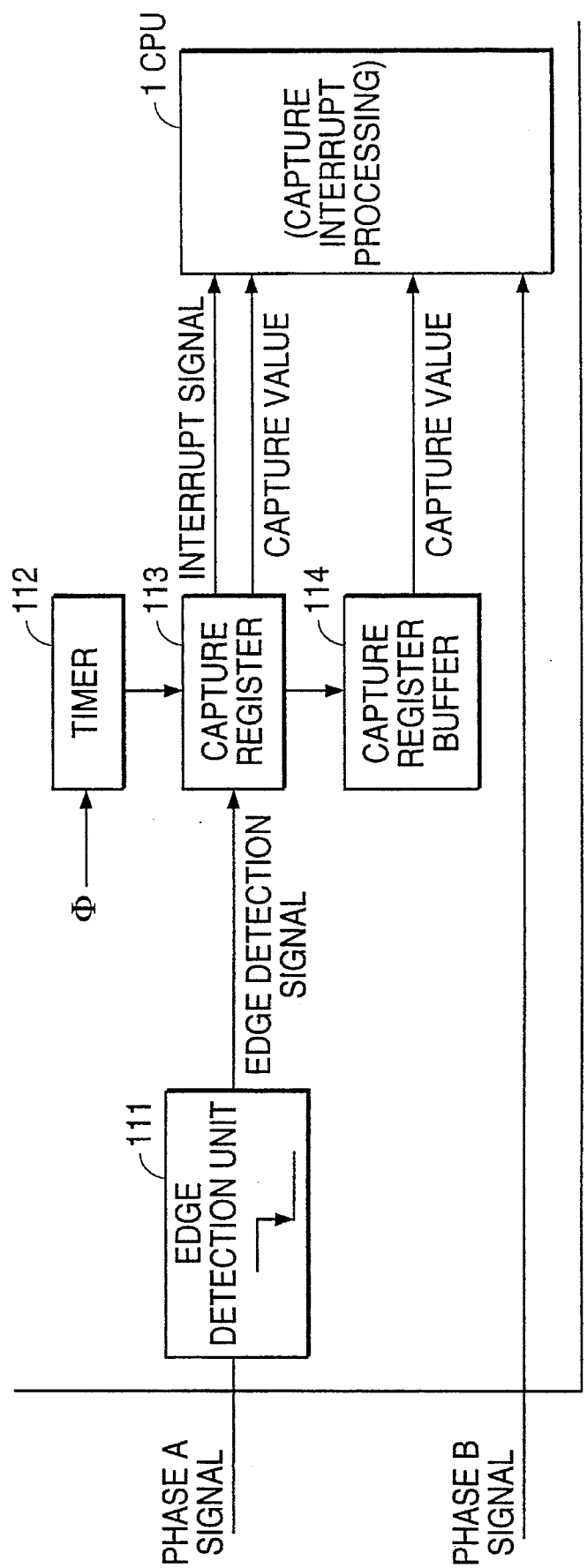
FIG. 6 is a block diagram illustrating a camera having a vibration control function, according to an embodiment of the present invention.

FIG. 6 is a block diagram illustrating a camera having a vibration control function, according to an embodiment of the present invention. More specifically, FIG. 6 illustrates peripheral circuits provided to CPU 1, according to an embodiment of the present invention. Alternatively, the peripheral circuits illustrated in FIG. 6 can be formed by CPU 1. As illustrated in FIG. 6, an edge detection unit 111 detects the phase A signal drop edge, and an edge detection signal at the time of detection is output to a capture register 113. A clock signal $\phi$ is received by a timer 112, which counts up in accordance with the increasing time. At the time when an edge detection signal is received from edge detection unit 111, the timer value of timer 112 at that time is read into capture register 113. Capture register 113 stores this time until capture register 113 receives the next edge detection signal. Also, at the time when an edge detection signal is received by capture register 113 from edge detection unit 111, the previous value stored in capture register 113 is transferred to a capture register buffer 114, and an interrupt signal is output by capture register 113. Capture register 113 and capture register buffer 114 are memory storage devices. The interrupt signal output by capture register 113 is provided to CPU 1. Capture interrupt processing of CPU 1 is activated by this interrupt signal. Therefore, the timer value of timer 112 at the time of the newest phase A signal drop is maintained in capture register 113. Also, the timer value of timer 112 at the time of the previous phase A signal drop is maintained in capture register buffer 114.

Figure 7:
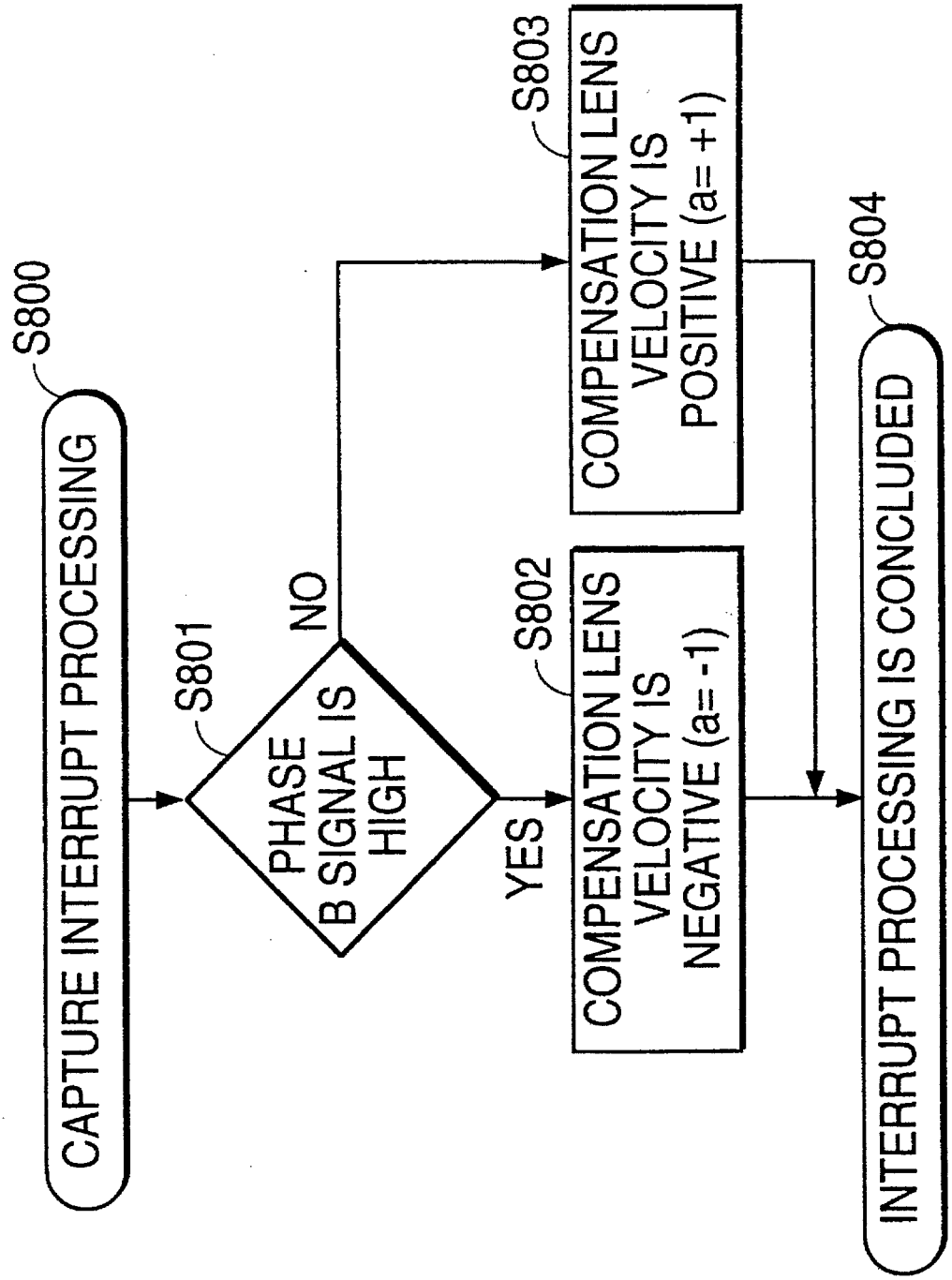
FIG. 7 is a flow chart illustrating capture interrupt processing of a camera, according to an embodiment of the present invention.

FIG. 7 is a flow chart illustrating capture interrupt processing of a camera, according to an embodiment of the present invention. Capture interrupt processing is interrupt processing which begins at the drop of the phase A signal. The direction of the velocity of compensation lens 8 can be detected from the phase of the phase B signal at the drop of the phase A signal. More specifically, as illustrated by FIG. 7, the sign of the velocity of compensation lens 8 (direction of movement) is determined by capture interrupt processing that is generated when the timer value of timer 112 is read into capture register 113 at the time of the phase A signal drop. As illustrated in FIG. 7, capture interrupt processing begins in step S800 at a drop of the phase A signal. From step S800, the process moves to step S801 where it is determined whether or not the phase B signal is high. If the phase B signal is high in step S801, the process moves to step S802 where the velocity of compensation lens 8 is taken to be negative with "a" equal to −1. If the phase B signal is low in step S801, the process moves to step S803 where the velocity of compensation lens 8 is taken to be positive with "a" equal to +1. From step S802 and step S803, the process moves to step S804 where capture interrupt processing is concluded.

The sign of the velocity of compensation lens 8 continues to be detected every time a drop of the phase A signal is detected, and the newest direction of the velocity of compensation lens 8 always continues to be written into variable "a". Also, the timer value of timer 112 at the time of the newest drop of the phase A signal is always retained in capture register 113, and the timer value of timer 112 at the time of the previous drop of the phase A signal is always maintained in capture register buffer 114. Therefore, the time of one cycle of the phase A signal can be calculated by taking the difference between the time stored in capture register 113 and the time stored in capture register buffer 114. Thus, it is possible to compute the absolute value of the velocity of compensation lens 8 by deriving that inverse number, and the value containing the sign of the velocity VR of compensation lens 8 can be detected based on the sign of the newest velocity of compensation lens 8 written in variable "a".

Figure 2:
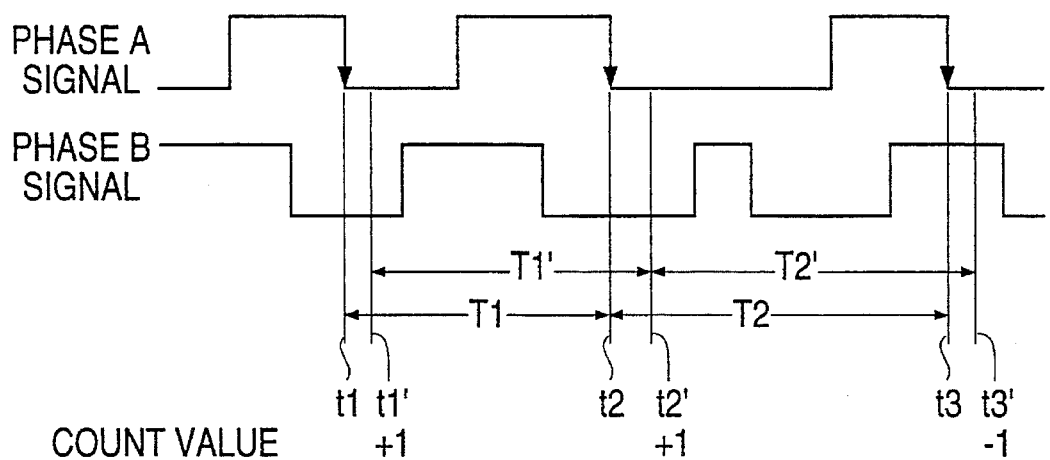
FIG. 2 is a waveform diagram illustrating the operation of a camera.

In a conventional interrupt processing program, a timer value is read by a CPU (see steps S504 and S505 in FIG. 4). However, according to an embodiment of the present invention, a drop of the phase A signal initiates the transfer of the value stored in capture register 113 into capture register buffer 114, and the current value of timer 112 is read into capture register 113. Consequently, the value of timer 112 is read into capture register 113 at a time which is approximately the same time, and is extremely close to, the time at which a drop in the phase A signal occurs. For example, as indicated by FIG. 2, t1, t2, t3, and their previous values, are sequentially transferred into capture register buffer 114 during the corresponding drops in the phase A signal. In this manner, the error in the detection of the velocity of compensation lens 8 is greatly improved since there is not a delay from the time a phase A signal drop is detected until the value in timer 112 is read.

Also, compared to the conventional interrupt processing of FIG. 4, the capture interrupt processing of FIG. 7 is simplified, and the time required for processing is shortened. The computation of the velocity of compensation lens 8 need not be executed every time there is a drop in the phase A signal, and computations at the required time can be executed from the values stored in capture register 113 and capture register buffer 114, and from the value of variable "a" determined in steps S802 and S803 in FIG. 7. Therefore, according to embodiments of the present invention, if the resolution of the interrupter signal is improved, the cycles of the phase A signal and the phase B signal become shorter. As a result, even if interrupt processing is activated frequently, high speed processing can be performed without using a high speed, high cost one-chip microcomputer.

Figure 8:
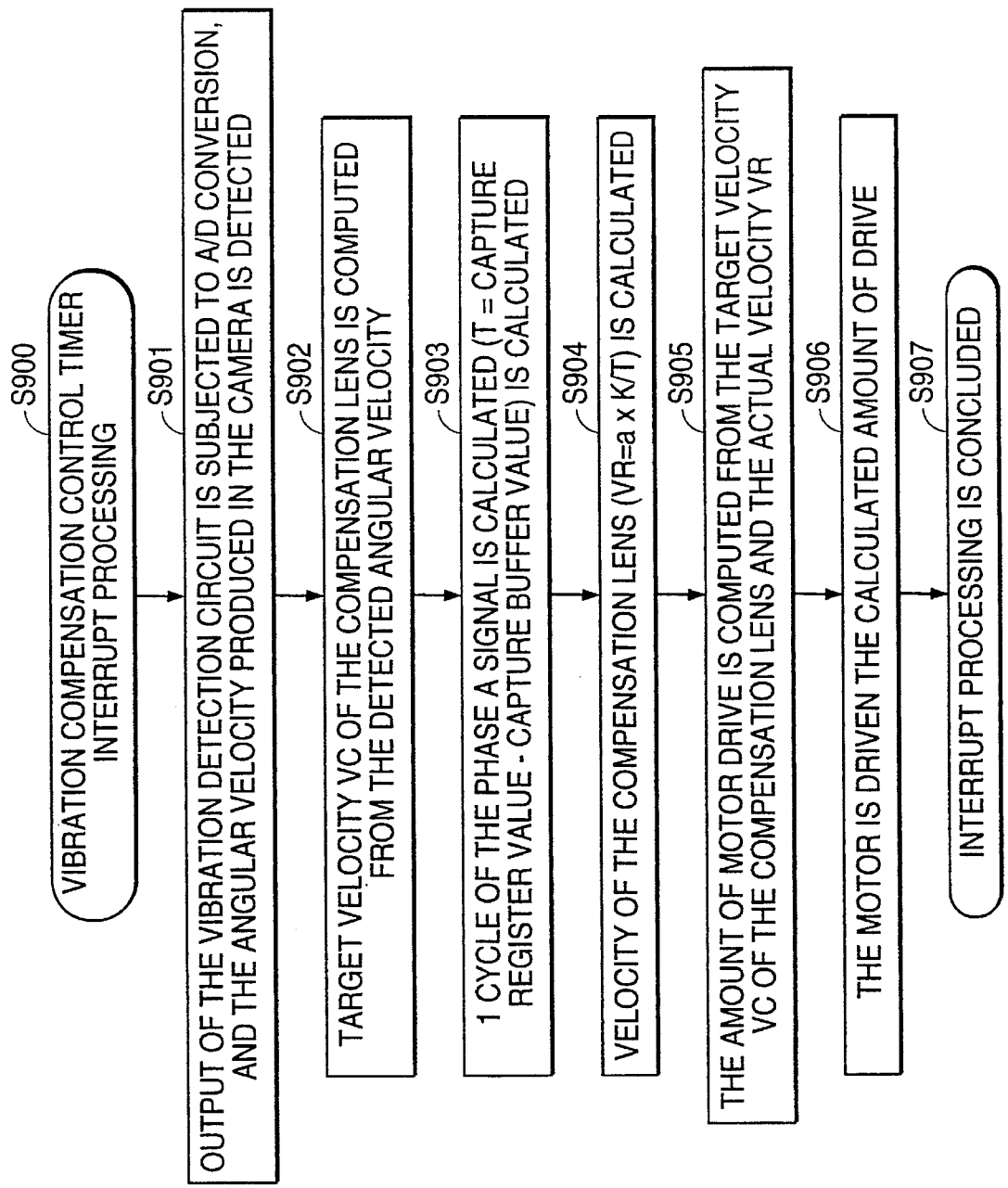
FIG. 8 is a flow chart illustrating vibration compensation control timer interrupt processing, according to an embodiment of the present invention.

FIG. 8 is a flow chart illustrating vibration compensation control timer interrupt processing, according to an embodiment of the present invention. More specifically, FIG. 8 illustrates vibration compensation control where the velocity VR of compensation lens 8 is computed with the value stored in capture register 113, the value stored in capture register buffer 114 and the sign of the velocity of compensation lens 8 determined in the capture interrupt processing of FIG. 7. Vibration compensation control timer interrupt processing of FIG. 8 is repeatedly executed at a specified interval, for example, at a 1 ms interval. As illustrated in FIG. 8, processing beings in step S900. From step S900, the process moves to step S901 where the angular velocity produced in the camera is detected by converting the analog output of vibration detection unit 5 to a digital signal utilizing an ND converter (not illustrated) incorporated into CPU 1. Vibration detection unit 5 is not limited to detecting angular velocity, but in order to simplify the following explanation, vibration detection unit 5 is assumed to be a device that detects angular velocity.

From step S901, the process moves to step S902 where the target velocity VC for compensation lens 8 is computed from the angular velocity detected at S901 using, for example, the previously described Equation 3. Next, in step S903, an accurate one cycle T of the phase A signal is calculated by subtracting the value of capture register buffer 114 (in which the previous timer value of timer 112 is stored) from the value of capture register 113 (in which the newest timer value of timer 112 is stored). From step S903, the process moves to step S904 where the velocity VR of compensation lens 8 is calculated by multiplying specified coefficient K and variable "a" (which is the sign of the newest velocity of compensation lens 8 detected from the capture interrupt processing illustrated in FIG. 7), by the inverse number of cycle T. Therefore, VR=aK/T. Coefficient K is a coefficient for matching the units with the target velocity VC of the compensation lens. From step S904, the process moves to step S905 where the amount of drive for motor 4 is conventionally calculated from target velocity VC of compensation lens 8 and velocity VR of compensation lens 8 detected in step S904. From step S905, the process moves to step S906 where motor 4 is driven via motor drive unit 2 by the amount of drive calculated in step S905. From step S905, the process moves to step S907 where vibration compensation control timer interrupt processing is concluded.

Figure 9:
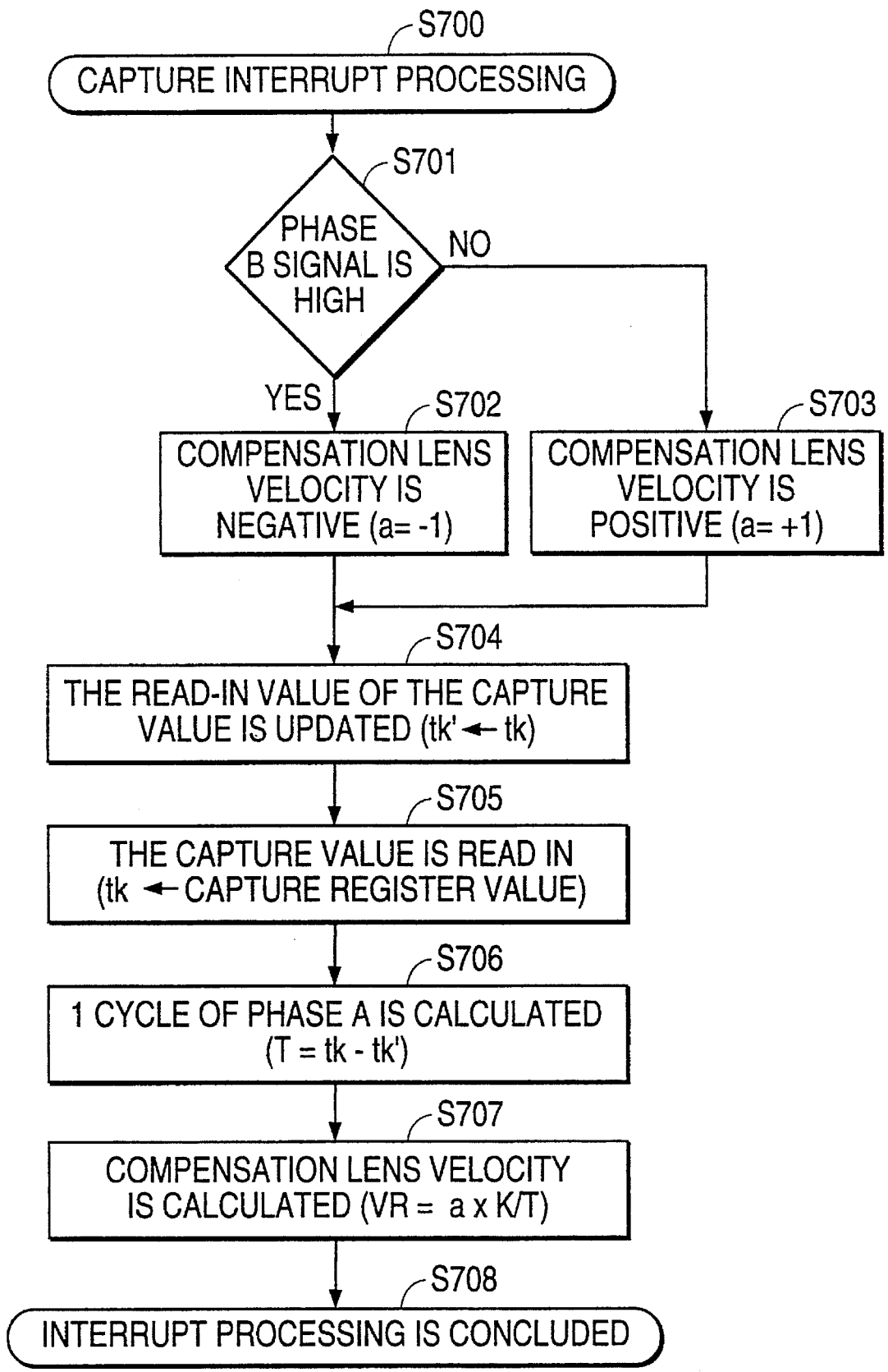
FIG. 9 is a flow chart illustrating capture interrupt processing, according to an embodiment of the present invention.

FIG. 9 is a flow chart illustrating capture interrupt processing, according to an additional embodiment of the present invention. The capture interrupt processing of FIG. 9 detects the velocity of compensation lens 8, but does not require CPU 1 to use a capture register buffer (such as capture register buffer 114 in FIG. 6). Referring now to FIG. 9, the capture interrupt processing begins in step S700. From step S700, the process moves to step S701 where it is determined whether the phase B signal is high. If the phase B signal is high in step S701, the process moves to step S702 where the velocity of compensation lens 8 is taken to be negative with a=−1. If the phase B signal is low in step S701, the process moves to step S703 where the velocity of compensation lens 8 is taken to be positive with a=+1. From steps S702 and S703, the process moves to step S704. In step S704, the previous value, tk, of capture register 113 that was set during the previous capture interrupt processing is entered to a variable tk', and the current value of capture register 113 is read by CPU 1 and becomes the new tk in step S705. Next, the process moves to step S706 where the time T of one cycle of the A phase is calculated by subtracting tk' from tk. From step S706, the process moves to step S707 where the velocity VR of compensation lens 8 is calculated by multiplying specified coefficient K and variable "a" (which is the sign of the velocity of compensation 8 that is determined in steps S702 and S703) by the inverse of T. Thus, VR=aK/T. From step S707, the process moves to step S708 where capture interrupt processing is concluded.

Figure 5:
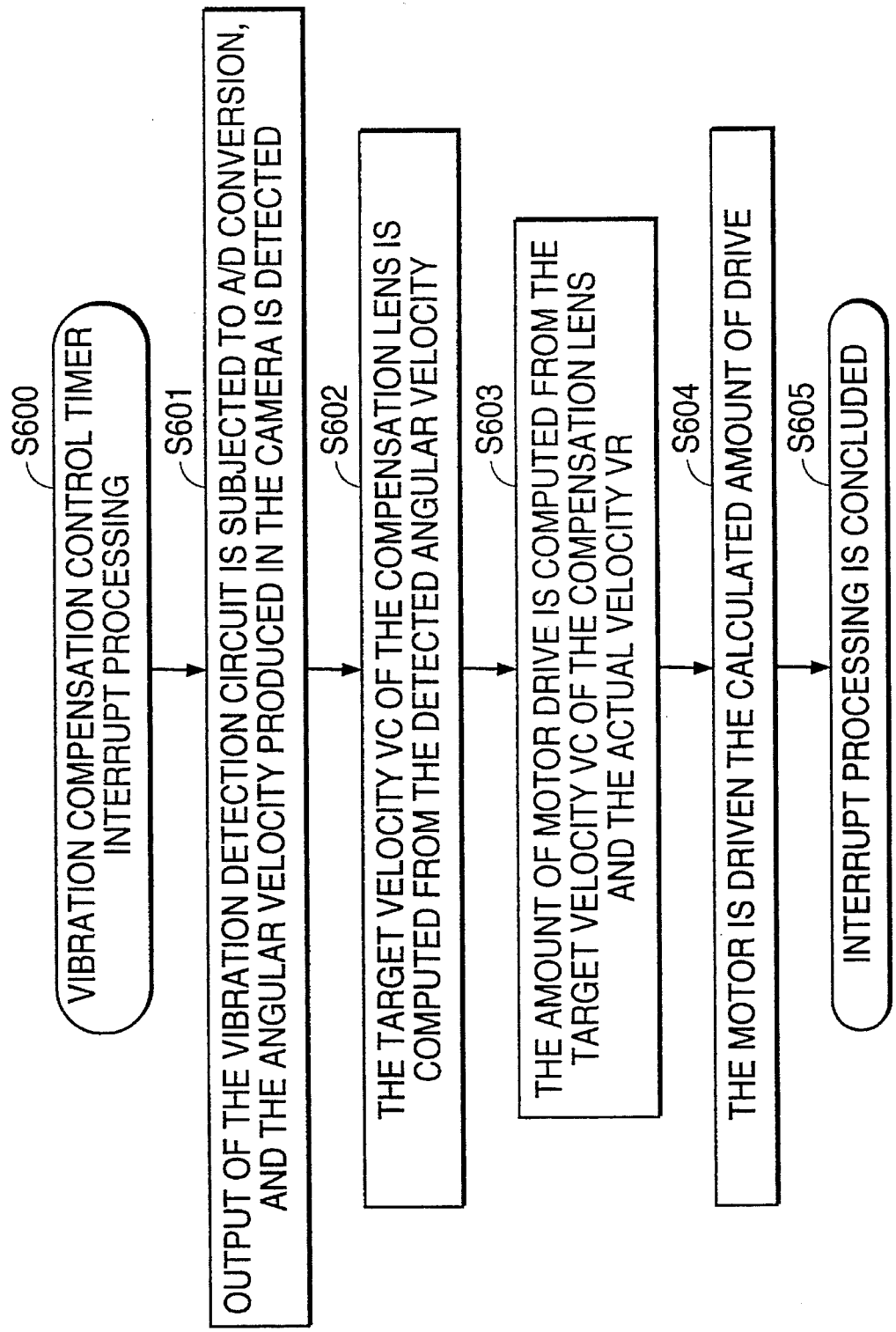
FIG. 5 (prior art) is a flow chart illustrating a conventional vibration compensation control timer interrupt processing of a camera.

In conventional interrupt processing as illustrated in FIG. 4, the timer value is read in step S505, and there is a time delay of step S505 due to the timing of the phase A signal drop. By contrast, in capture interrupt processing according to an embodiment of the present invention as illustrated in FIG. 9, the value of capture register 113 is read in step S705. Step S705 of FIG. 9 has about the same delay as step S505 in the conventional example of FIG. 4, but the capture register value read in step S705 of FIG. 9 is a value of timer 112 that has already been read into capture register 113 at the time of the phase A signal drop. Therefore, according to the embodiment of the present invention as illustrated in FIG. 9, it is possible that the value read at step S705 be read as a value very close to the value of timer 112 at the time of the phase A signal drop. Consequently, one cycle of the phase A signal, as calculated in step S706 of FIG. 9, can be calculated with more precise values as compared to a conventional method. Further, the velocity VR of compensation lens 8, calculated in S707 of FIG. 9, can be calculated with better precision as compared to a conventional method. The method of controlling vibration compensation may be executed, for example, using the conventional vibration compensation control timer interrupt processing of FIG. 5.

According to the embodiments of the present invention, the velocity of compensation lens 8 is determined by detecting a drop of the phase A signal. However, the velocity can also be determined by using the phase B signal. The velocity of compensation lens 8 may also be determined by detecting both the rise and the drop of the phase A signal and the phase B signal, and detecting the half cycle of the phase A signal or the phase B signal. In this case, edge detection unit 111 may be configured to detect either or both of a rising edge or a falling edge of a signal.

Moreover, according to embodiments of the present invention, the interrupter signal is a two phase interrupter signal. However, if an independent mechanism other than interrupter 3 is used to detect the direction of movement of compensation lens 8, the device may be configured such that the value of timer 112 is read into capture register 113 when there is a rise or a drop of a one phase interrupter signal.

Embodiments of the present invention are described as relating to a silver salt film camera. However, embodiments of the present invention are not limited to a silver salt film camera. For example, embodiments of the present invention can be applied to an electronic still camera or a video camera.

Further, embodiments of the present invention are described as relating to the compensation of vibrations affecting the image plane by driving motor 4 to shift compensation lens 8. However, a Varian group rhythm may be used instead of compensation lens 8. Also, other actuators (for example, voice coils) may be used instead of motor 4. Moreover, vibration detection unit 5 is described as detecting angular velocity through the use of an angular velocity sensor. However, other devices can be used to detect vibration. For example, a vibration detection unit can be used which produces signals in correspondence with an acceleration or a position dimension produced by vibration.

According to embodiments of the present invention, a time value of timer 112 is read into capture register 113 at the time of detection of an edge of the interrupter signal, and the velocity of compensation lens 8 is then computed from the value of capture register 113. As a result, the precision of detecting the compensation lens velocity can be improved, and the performance in controlling vibration compensation is enhanced.

Also, according to embodiments of the present invention, the timer value of timer 112 is read into capture register 113 at the time of detecting the edge of the interrupter signal, and the previously stored capture register value (that is, the timer value at the time of detecting the edge of the previous interrupter signal) is read into capture register buffer 114 at that time. As a result, the velocity of compensation lens 8 is calculated from the values of capture register 113 and capture register buffer 114. In this manner, it is possible to improve the precision of detecting the compensation lens velocity, and to improve the precision in controlling vibration compensation. Furthermore, because the interrupt processing of the single chip microcomputer (CPU 1) is simplified, processing can be accomplished at high speeds without using such a high performance single chip microcomputer.

In the above manner, wherein in a photographic device having a vibration compensation function according to embodiments of the present invention, the timer value at the time of detecting the edge of the interrupter signal is read into a memory device. Also, a control device calculates the displacement velocity of the optical axis change device from the value of the memory device. As a result, it is possible to improve the precision of detecting the movement velocity of the compensation lens compared to when the control device calculates the displacement velocity of the compensation lens from the timer value. Therefore, vibration compensation is improved.

According to embodiments of the present invention, a photographic device includes an optical axis change device (such as compensation lens 8) to change the optical axis in order to compensate for vibration. A displacement signal output unit (such as detection interrupter 3) produces a displacement signal corresponding to the optical axis change device as interrupter signals. A drive device (such as motor drive unit 2 and motor 4) move the optical axis change device. A timer (such as timer 112) conducts a count corresponding to a specified clock signal. A memory device (such as capture register 113) reads in, and stores, the timer value when there is a rise or drop of the interrupter signal. A processor (such as CPU 1) detects the velocity of the optical axis change device from the value stored in the memory device.

In a camera according to embodiments of the present invention, the value of timer 112 at the time of detection of the edge of the interrupter signal is read into the memory device, and the processor computes the displacement velocity of the optical axis change device using the value of this memory device. Therefore, as compared to when the processor computes the displacement velocity of the optical axis change device from the timer value read directly from a timer, the precision of detecting the movement velocity of the optical axis change device (compensation lens 8) can be improved.

The above embodiments are described as relating to a camera. However, embodiments of the present invention can be applied to virtually any type of optical device which shifts a compensation lens. For example, the present invention can be used in camcorders, motion picture cameras, telescopes, binoculars, microscopes, range finding equipment, lasers, fiber optic communication systems, various optical projection systems, CD mastering systems and other types of devices.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device comprising:

a movable member movable to suppress image blur affecting the optical device;

a position detecting device to detect the position of the movable member and to produce a position detection signal having change points occurring to indicate the position of the movable member;

a timer to produce a count value;

a first memory device to store the count value of the timer when a change point occurs in the position detection signal; and a control device to determine the displacement velocity of the movable member from the count value stored in the first memory device, wherein first and second change points occur in the position detection signal the timer produces first and second count values corresponding, respectively, to the first and second change points, and the first memory device stores the first count value of the timer upon the occurrence of the first change point and the optical device further comprises a second memory device to receive the first count value from the first memory device upon the occurrence of the second change point, the first memory device then receiving the second count value from the timer, and the control device receiving the first count value from the second memory device and the second count value from the first memory device and determining the displacement velocity of the movable member in accordance with the first and second count values.

2. An optical device as in claim 1, wherein the position detection signal produced by the position detecting device includes first and second phase signals.

3. An optical device as in claim 2, wherein the position detecting device is an interrupter.

4. An optical device as in claim 1, wherein the position detection signal produced by the position detecting device includes first and second phase signals, and the first memory device stores the count value of the timer when a change point occurs in at least one of the first and second phase signals.

5. An optical device as in claim 4, wherein the position detecting device is an interrupter.

6. An optical device as in claim 1, wherein the optical device has an optical axis extending therethrough and the movable member is a lens which is shiftable in directions perpendicular to the optical axis to suppress image blur affecting the optical device.

7. An optical device as in claim 6, wherein the optical device is a camera.

8. An optical device in claim 1, wherein the optical device has an optical axis extending therethrough the movable member is a lens which is shiftable in directions perpendicular to the optical axis to suppress image blur affecting the optical device.

9. An optical device as in claim 8, wherein the optical device is a camera.

10. An optical device comprising:

a movable member movable to suppress image blur affecting the optical device;

a position detecting device to detect the position of the movable member and to produce a position detection signal having change points occurring to indicate the position of the movable member;

a timer to produce a count value;

a first memory device to store the count value of the timer when a change point occurs in the position detection signal;

a control device to determine the displacement velocity of the movable member from the count value stored in the first memory device; and a second memory device to store the first count value of the first memory device immediately before the first memory device stores the second count value, the control device determining the displacement velocity of the movable member from the first count value stored in the second memory device and the second count value stored in the first memory device.

11. An optical device as in claim 10, wherein the position detection signal produced by the position detecting device includes first and second phase signals.

12. An optical device as in claim 11, wherein the position detecting device is an interrupter.

13. An optical device as in claim 10, wherein the optical device has an optical axis extending therethrough and the movable member is a lens which is shiftable in directions perpendicular to the optical axis to suppress image blur affecting the optical device.

14. An optical device having an optical axis extending therethrough, comprising:

a lens movable in directions perpendicular to the optical axis to suppress image blur affecting the optical device;

an interrupter to detect the position of the lens and producing a position detection signal having change points occurring to indicate the position of the lens;

a timer to produce a count value;

a first memory device to store the count value of the timer when a change point occurs in the position detection signal; and a control device to determine the displacement velocity of the lens from the count value stored in the first memory device, wherein first and second change points occur in the position detection signal, the timer produces first and second count values corresponding, respectively, to the first and second change points, and the first memory device stores the first count value of the timer upon the occurrence of the first change point, and the optical device further comprises a second memory device to receive the first count value from the first memory device upon the occurrence of the second change point, the first memory device then receiving the second count value from the timer, and the control device receiving the first count value from the second memory device and the second count value from the first memory device and determining the displacement velocity of the movable member in accordance with the first and second count values.

15. An optical device as in claim 14, wherein the optical device is a camera.

* * * * *

UNITED STATES PATENT AND TRADEMARK OFFICE
CERTIFICATE OF CORRECTION

PATENT NO. : 5,623,327
DATED : April 22, 1997
INVENTOR(S) : Sueyuki OHISHI et al.

It is certified that error appears in the above-indentified patent and that said Letters Patent is hereby corrected as shown below:

Col. 12, claim 1, line 44, after "signal", insert --,-- (comma);

claim 1, line 48, after "point", insert --,-- (comma).

Signed and Sealed this

First Day of July, 1997

Attest:

BRUCE LEHMAN

Attesting Officer

Commissioner of Patents and Trademarks